(12) United States Patent
McKinzie et al.

(10) Patent No.: US 9,897,986 B2
(45) Date of Patent: Feb. 20, 2018

(54) SYSTEM AND METHOD FOR ENABLING A MOTOR CONTROLLER TO COMMUNICATE USING MULTIPLE DIFFERENT COMMUNICATION PROTOCOLS

(71) Applicant: Regal Beloit America, Inc., Beloit, WI (US)

(72) Inventors: Marc McKinzie, West Milton, OH (US); Vinod Bhansali, Germantown, WI (US)

(73) Assignee: Regal Beloit America, Inc., Beloit, WI (US)

(*) Notice: Subject to any disclaimer, the term of this patent is extended or adjusted under 35 U.S.C. 154(b) by 877 days.

(21) Appl. No.: 14/066,144

(22) Filed: Oct. 29, 2013

(65) Prior Publication Data
US 2015/0120062 A1 Apr. 30, 2015

(51) Int. Cl.
*A61B 17/068* (2006.01)
*B64C 39/02* (2006.01)
*G05D 1/00* (2006.01)
*A61B 17/072* (2006.01)
*G05B 15/02* (2006.01)
(Continued)

(52) U.S. Cl.
CPC ......... *G05B 15/02* (2013.01); *G05B 19/0423* (2013.01); *H04L 69/18* (2013.01); *G05B 2219/25008* (2013.01); *G05B 2219/25217* (2013.01)

(58) Field of Classification Search
CPC ... G05B 15/02; G05B 19/0423; F24F 11/006; F24F 11/0086; F24F 2011/0071; F24F 2011/0091; H04L 69/18; G06F 3/12; G06F 3/1209; G06F 3/1236; G06F 3/128; Y02T 90/14; Y02T 90/121; Y02T 90/128;
(Continued)

(56) References Cited

U.S. PATENT DOCUMENTS 6,083,139 A 7/2000 Deguchi et al.
6,950,882 B1 9/2005 Weber et al.
(Continued)

FOREIGN PATENT DOCUMENTS

CA 2360067 A1 5/2001
CN 1971463 A 5/2007
(Continued)

OTHER PUBLICATIONS

Wei et al., RT-WiFi: real-time high speed communication protocol for wireless control systems, Jul. 2013, 1 page.*
(Continued)

*Primary Examiner* — Thuy Dao
(74) *Attorney, Agent, or Firm* — Armstrong Teasdale LLP (57) ABSTRACT

A motor controller including a communication port and a computing device coupled to the communication port is described. The computing device is capable of communicating using a plurality of communication protocols and is configured to detect that an external device has connected to the communication port. The computing device is further configured to identify a first communication protocol used by the external device, wherein the first communication protocol is one of the plurality of communication protocols, and communicate with the external device using the first communication protocol.

10 Claims, 4 Drawing Sheets

(51) Int. Cl.
*G05B 19/042* (2006.01)
*H04L 29/06* (2006.01)

(58) Field of Classification Search
CPC ............ Y02T 10/7005; B60L 11/1816; A61B 2017/00398; A61B 2017/00482
See application file for complete search history.

(56) References Cited

U.S. PATENT DOCUMENTS

| | | | |
|---|---|---|---|
| 7,570,656 B2 | 8/2009 | Raphaeli et al. | |
| 7,631,055 B1* | 12/2009 | Stamler | G06Q 10/087 709/220 |
| 8,016,218 B1 | 9/2011 | Friedman | |
| 9,307,986 B2* | 4/2016 | Hall | A61B 17/068 |
| 9,468,438 B2* | 10/2016 | Baber | A61B 17/068 |
| 9,554,794 B2* | 1/2017 | Baber | A61B 17/07207 |
| 9,782,169 B2* | 10/2017 | Kimsey | A61B 17/07207 |
| 2003/0103521 A1 | 6/2003 | Raphaeli et al. | |
| 2005/0256934 A1* | 11/2005 | Motoyama | H04L 69/18 709/208 |
| 2006/0198735 A1* | 9/2006 | Iijima | F04C 13/005 417/44.1 |
| 2009/0004024 A1* | 1/2009 | Durham | F02D 41/26 417/2 |
| 2010/0131083 A1* | 5/2010 | Leany | H02P 23/0027 700/83 |
| 2011/0228106 A1* | 9/2011 | Mizumura | G03B 17/14 348/207.1 |
| 2012/0026018 A1* | 2/2012 | Lin | G06F 13/4068 341/26 |
| 2014/0042831 A1* | 2/2014 | DiLuciano | B60L 3/0092 307/328 |

FOREIGN PATENT DOCUMENTS

| | | |
|---|---|---|
| CN | 1533643 B | 6/2010 |
| CN | 202472293 U | 10/2012 |
| DE | 3928451 A1 | 3/1991 |
| JP | 2000132615 A | 5/2000 |
| JP | 3537680 B2 | 3/2004 |
| JP | 2008061728 A | 3/2008 |
| JP | 4152880 B2 | 9/2008 |
| JP | 2008252925 A | 10/2008 |
| JP | 4473878 B2 | 6/2010 |
| JP | 2010142233 A | 7/2010 |
| KR | 100882202 B1 | 2/2009 |
| KR | 20100133376 A | 12/2010 |
| WO | 0135216 A2 | 5/2001 |
| WO | 02103943 A1 | 12/2002 |
| WO | 2005067408 A2 | 7/2005 |

OTHER PUBLICATIONS

Paquette et al., Menu controller: making existing software more accessible for people with motor impairments, May 2011, 8 pages.*

* cited by examiner

Figure 4

SYSTEM AND METHOD FOR ENABLING A MOTOR CONTROLLER TO COMMUNICATE USING MULTIPLE DIFFERENT COMMUNICATION PROTOCOLS

BACKGROUND

The field of the disclosure relates generally to motors, and more particularly, to systems and methods for enabling a motor controller to communicate with external devices that use different communication protocols.

At least some known systems used in fluid moving applications, such as pumping water or moving air (e.g., in a heating, ventilation, and air conditioning (HVAC) system) include a motor, for example a variable speed electric motor, coupled to a motor controller. In some known systems that include motors and motor controllers, the motor and the motor controller are configured to communicate using a single communication protocol. For example, the communication protocol may be associated with a manufacturer of the motor and the motor controller. Additionally, a diagnostic tool or configuration tool produced by the same manufacturer and configured to communicate using the communication protocol may be coupled to the motor or motor controller to configure operating parameters of the motor and/or obtain status codes and/or fault codes. However, external devices such as system level controllers, user interfaces, diagnostic tools, or configuration tools generated by a different manufacturer may be incompatible with the system. More specifically, such external devices may not be configured to communicate using the particular communication protocol used by the system. Accordingly, it would be beneficial to enable a motor controller to communicate with external devices that use different communication protocols.

BRIEF DESCRIPTION

In one aspect, a motor controller is provided. The motor controller includes a communication port and a computing device coupled to the communication port. The computing device is capable of communicating using a plurality of communication protocols and is configured to detect that an external device has connected to the communication port. The computing device is further configured to identify a first communication protocol used by the external device, wherein the first communication protocol is one of the plurality of communication protocols. The computing device is further configured to communicate with the external device using the first communication protocol.

In another aspect, a method for enabling communication between a motor controller and an external device is provided. The method includes detecting, by a computing device in the motor controller, that the external device has connected to a communication port coupled to the computing device. The method additionally includes identifying, by the computing device, a first communication protocol used by the external device, wherein the first communication protocol is one of a plurality of communication protocols that the computing device is capable of using. The method additionally includes communicating with the external device using the first communication protocol.

In another aspect, a computer-readable storage device having processor-executable instructions embodied thereon, for enabling communication between a motor controller and an external device, is provided. When executed by a computing device included in the motor controller and coupled to a communication port, the processor-executable instructions cause the computing device to detect that an external device has connected to the communication port, identify a first communication protocol used by the external device, wherein the first communication protocol is one of a plurality of communication protocols that the computing device is capable of using, and communicate with the external device using the first communication protocol.

DETAILED DESCRIPTION

Implementations of the systems and methods described herein enable a motor, such as a variable speed electric motor, to be controlled by a variety of external devices. More specifically, in one example, a motor controller is coupled to the motor. The motor controller includes a communication port, for example a serial communication port, configured to couple with an external device. Examples of external devices include user interfaces, system level controllers, diagnostics tools, and configuration tools. Each external device may be configured to communicate using a different communication protocol. The motor controller is configured to communicate using a plurality of communication protocols, including the communication protocols used by the external devices. For example, the motor controller may include a computing device having a memory that stores executable instructions for communicating using each of the plurality of communication protocols used by the external devices. Additionally, the computing device may include a processor configured to detect that an external device has connected to the communication port, identify the communication protocol used by the external device, and thereafter communicate with the external device using the identified communication protocol. Accordingly, the external device may control operations of the motor, such as a speed, as well as start times and stop times. Additionally, the external device may receive diagnostic information from the motor, such as status codes and/or fault codes.

In one implementation, a computer program is provided, and the program is embodied on a computer-readable medium. In an example implementation, the system is executed on a single computing device, without requiring a connection to a sever computer. The computer program is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

Figure 1:
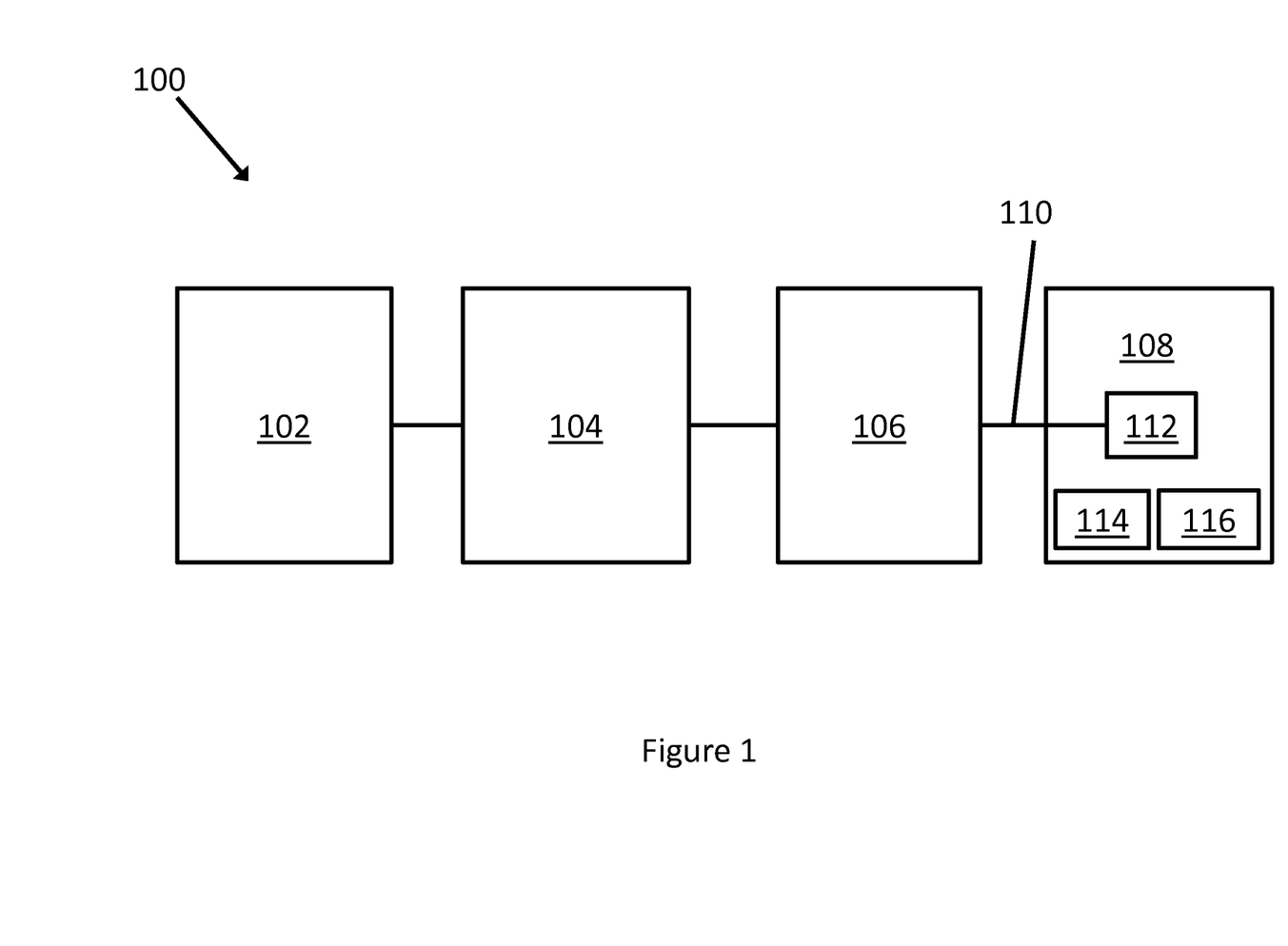
FIG. 1 is a block diagram of an example system including a user interface coupled to a motor controller that is coupled to a motor that drives a pump.

FIG. 1 is a block diagram of an example system 100 that includes a user interface 102 (an "external device") coupled to a motor controller 104. Motor controller 104 is coupled to a motor 106. In some implementations, motor controller 104 is incorporated within motor 106. Motor 106 may be an electric motor and, in some implementations, is an electric variable speed motor. Motor 106 drives a pump 108. More specifically, motor 106 is coupled to pump 108 by a shaft 110. Shaft 110 rotates to turn an impeller 112. Pump 108 includes an inlet 114 and an outlet 116. In some implementations, system 100 is used to move liquid, such as water, in a pool, spa, or other aquatic environment. In such implementations, inlet 114 receives the water and outlet 116 expels the received water. In other implementations, motor 106 drives a fan for moving air, for example in a heating, ventilation, and air conditioning (HVAC) system. Motor controller 104 is configured to operate motor 106 according to parameters stored in a memory 310 (FIG. 3) of motor controller 104. The parameters may include modes of operation, wherein each mode is associated with a time period and a speed. For example, one mode may be to operate motor 106 at 2100 rotations per minute (RPM) from 1:00 PM to 6:00 PM. In other implementations, the time period is specified as a duration, such as five hours, rather than as an absolute start time and absolute stop time.

User interface 102 communicates with motor controller 104 using a first communication protocol. For example, user interface 102 and motor controller 104 may be produced by the same manufacturer and the first communication protocol may be a proprietary communication protocol developed by the manufacturer. However, as described with reference to FIG. 2, motor controller 104 may communicate with other external devices that are configured to communicate using different communication protocols. Accordingly, external devices developed by other manufacturers and/or external devices developed by the same manufacturer but which use different communication protocols than the proprietary communication protocol referenced above may still communicate with motor controller 104 and thereby control motor 106.

Figure 2:
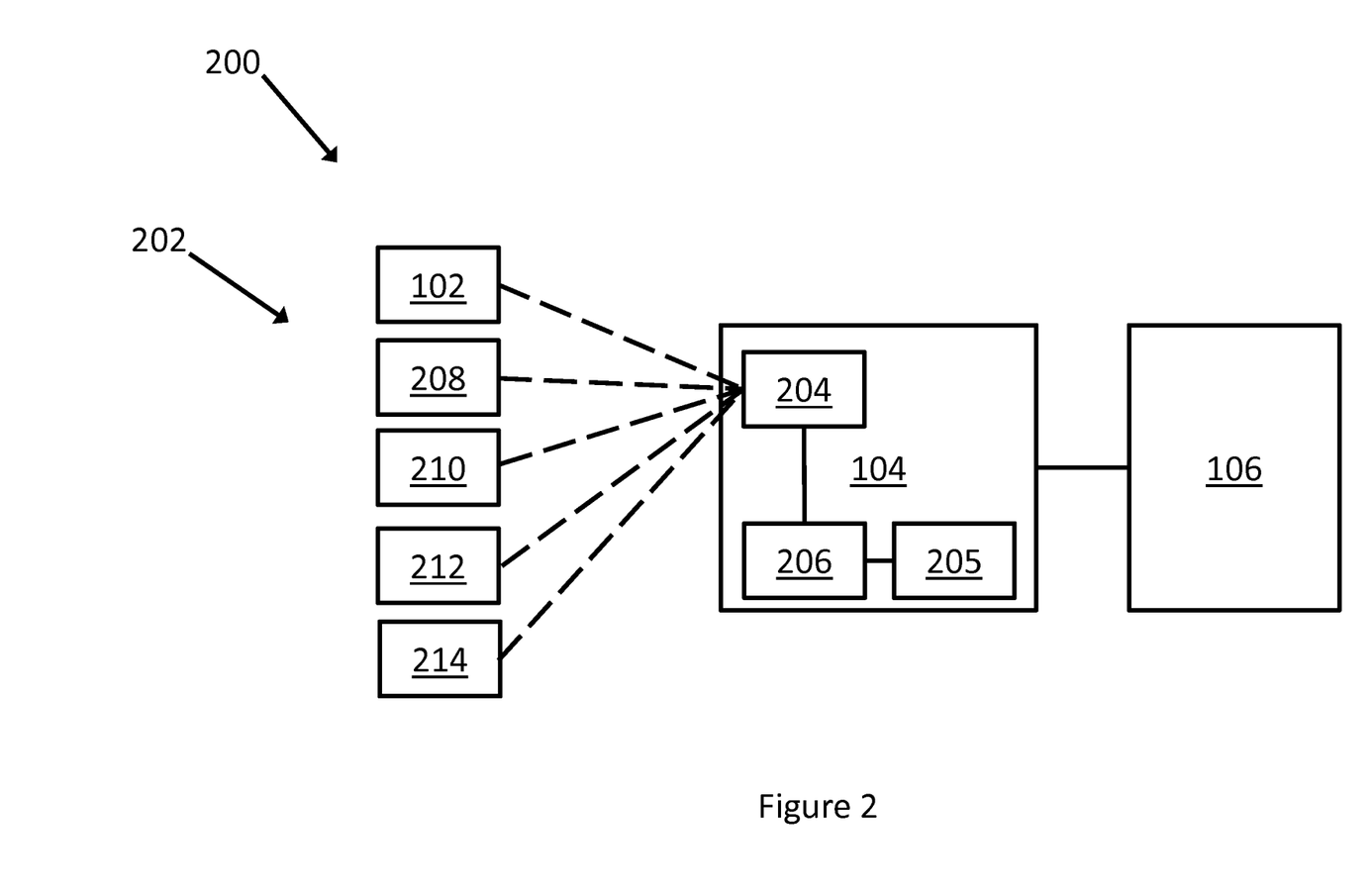
FIG. 2 is a diagram of a system including multiple external devices that may be coupled to the motor controller of FIG. 1.

FIG. 2 is a diagram of a system 200 that includes a plurality of external devices 202 that may be coupled to motor controller 104. Motor controller 104 includes a communication port 204 and a computing device 206 that is coupled to communication port 204. Additionally, motor controller 104 may include a communication protocol selection device 205, for example a jumper, dial, or switch, coupled to computing device 206. Communication port 204 may include, for example, a serial communication port, such as an RS-485 port. In other implementations, communication port 204 may include a different type of wired communication port, such as a universal serial bus (USB) port or IEEE 1394 High Speed Serial Bus port, or a wireless communication port. Each of the plurality of external devices 202 is configured to communicate using a different communication protocol. More specifically, user interface 102 is configured to communicate using a first communication protocol, first system level controller 208 is configured to communicate using a second communication protocol, second system level controller 210 is configured to communicate using a third communication protocol, diagnostic tool 212 is configured to communicate using a fourth communication protocol, and configuration tool 214 is configured to communicate using a fifth communication protocol.

Computing device 206 is configured to detect that one of the plurality of external devices 202 has connected to communication port 204, identify a communication protocol used by the external device 202, and communicate with external device 202 using the identified communication protocol, as described herein. For example, in some implementations, computing device 206 may detect that communication protocol selection device 205 has been set to a first communication protocol of multiple communication protocols. More specifically, for example, communication protocol selection device 205 may be a jumper that, when set to a first position, causes motor controller 104 to communicate using a first communication protocol and when set to a second position, causes motor controller 104 to communicate using a second communication protocol. As described above, in other implementations, communication protocol selection device 205 may be a dial, switch, or other physical device that enables a user to select among communication protocols. In yet other implementations, motor controller 104 does not include a physical communication protocol selection device 205. For example, computing device 206 may instead identify a communication protocol used by external device 202 by iteratively attempting to communicate with external device 202 with each communication protocol that computing device 206 is configured to communicate with, until successful communication is established.

As an illustrative example, user interface 102 may initially be used to communicate with motor controller 104 and thereby control operations of motor 106. However, first system level controller 208 may subsequently replace user interface 102 and be used to communicate not only with motor controller 104, but additional devices as well, including one or more lights (not shown) and one or more heaters (not shown). Given that motor controller 104 is configured to communicate using a plurality of communication protocols, motor controller 104 may communicate with first system level controller 208, even though user interface 102 and first system level controller 208 are configured to communicate using different communication protocols.

As another illustrative example, first system level controller 208 may subsequently be replaced by second system level controller 210, which may be capable of controlling additional devices (not shown) and/or provide additional features over first system level controller 208. Despite the fact that second system level controller 210 is configured to communicate using a different communication protocol (i.e., the third communication protocol) than the communication protocol used by first system level controller 208 (i.e., the second communication protocol), second system level controller 210 may still communicate with motor controller 104 and thereby control motor 106. That is, motor controller 104 is configured to communicate using the plurality of communication protocols, including the second communication protocol and the third communication protocol.

In a similar manner, diagnostic tool 212 may communicate with motor controller 104 to obtain status codes and/or fault codes, and configuration tool 214 may communicate with motor controller 104 to configure parameters of motor controller 104 and/or motor 106 even though diagnostic tool 212 and configuration tool 214 are configured to communicate using different communication protocols.

Figure 3:
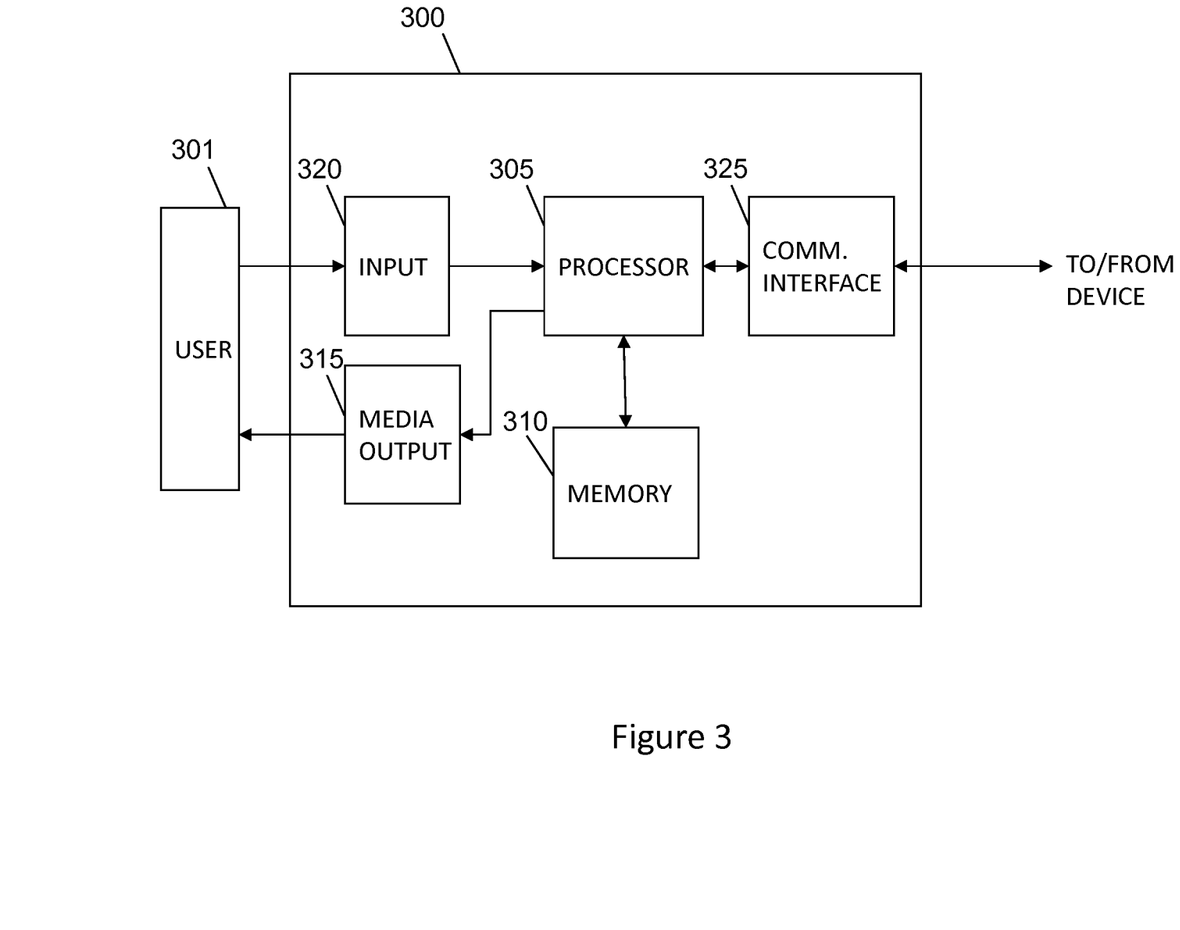
FIG. 3 is a bock diagram of an example computing device that may be incorporated in the systems of FIGS. 1 and 2.

FIG. 3 is a bock diagram of an example computing device 300 that may be incorporated in one or more components of systems 100 and 200 (FIGS. 1 and 2). For example, computing device 206 (FIG. 2) may be an instance of computing device 300. Additionally, one or more of external devices 202 (FIG. 2) may include a computing device similar to computing device 300. Computing device 300 includes a processor 305 for executing instructions. In some implementations, executable instructions are stored in a memory area 310. Processor 305 may include one or more processing units (e.g., in a multi-core configuration). Memory area 310 is any device allowing information such as executable instructions and/or other data to be stored and retrieved. With respect to computing device 206, memory area 310 stores executable instructions for communicating using a plurality of communication protocols, including the first communication protocol, the second communication protocol, the third communication protocol, the fourth communication protocol, and the fifth communication protocol. Memory area 310 may include one or more computer-readable media.

In some implementations, computing device 300 also includes at least one media output component 315 for presenting information to user 301. Media output component 315 is any component capable of conveying information to user 301. In some implementations, media output component 315 includes an output adapter such as a video adapter and/or an audio adapter. An output adapter is operatively coupled to processor 305 and operatively couplable to an output device such as a display device (e.g., a liquid crystal display (LCD), one or more light emitting diodes (LED), an organic light emitting diode (OLED) display, cathode ray tube (CRT), or "electronic ink" display) or an audio output device (e.g., a speaker or headphones). In other implementations, computing device 300 does not include media output component 315.

In some implementations, computing device 300 includes an input device 320 for receiving input from user 301. Input device 320 may include, for example, one or more buttons, a keypad, a touch sensitive panel (e.g., a touch pad or a touch screen), and/or a microphone. A single component such as a touch screen may function as both an output device of media output component 315 and input device 320.

Computing device 300 may also include a communication interface 325, which is communicatively couplable to another device. For example, communication interface 325 may include or be coupled to communication port 204 (FIG. 2) to enable communication with one or more of external devices 202 (FIG. 2). Additionally, communication interface 325 may couple motor controller 104 to motor 106. Communication interface 325 may include, for example, one or more conductors for transmitting electrical signals and/or power. In other implementations, communication interface 325 may additionally or alternatively include a wired or wireless network adapter, for example for use with a wireless network implemented pursuant to an IEEE (Institute of Electrical and Electronics Engineers) 802.11 standard (i.e., WiFi), or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Figure 4:
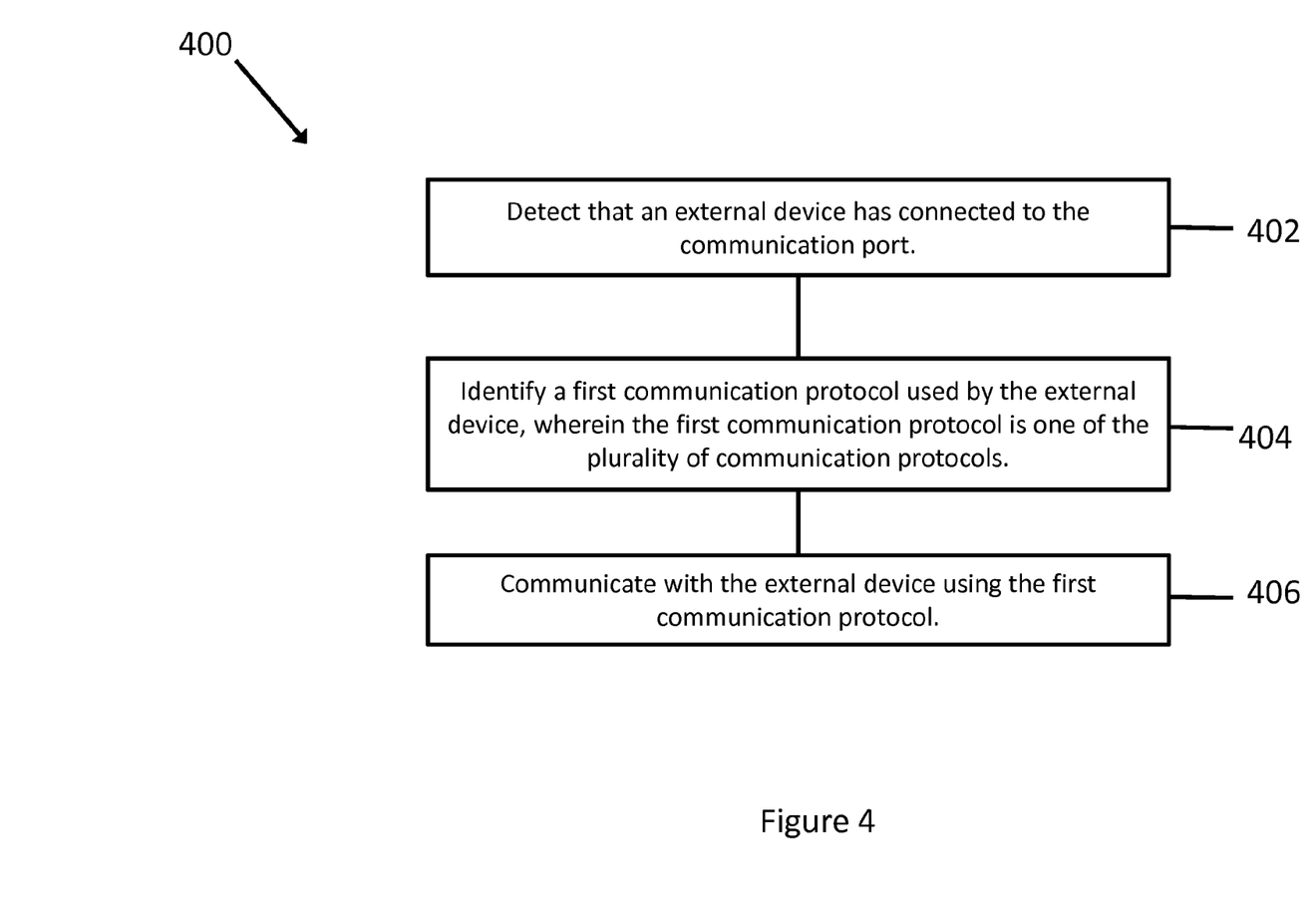
FIG. 4 is a flow chart of an example process that may be carried out by the motor controller shown in FIGS. 1 and 2.

FIG. 4 is a flow chart of an example process 400 that may be carried out by computing device 206 (FIG. 2) to enable communication between motor controller 104 and at least one of external devices 202 (FIG. 2). Initially, computing device 206 detects 402 that external device 202 (e.g., user interface 102) has connected to communication port 204. For example, computing device 206 may detect a voltage change at communication port 204 that indicates that external device 202 is connected. Next, computing device 206 identifies 404 a first communication protocol (e.g., the first communication protocol) used by external device 202 (e.g., user interface 102). The first communication protocol is one of the plurality of communication protocols stored in memory area 310. For example, computing device 206 may detect that communication protocol selection device 205 has been set to the first communication protocol. As another example, computing device 206 may transmit an initial communication to external device 202 (e.g., user interface 102) using the first communication protocol and receive a response from external device 202 (e.g., user interface 102) using the first communication protocol.

Additionally, computing device 206 may transmit the initial communication to external device 202 (e.g., user interface 102) using the second communication protocol, wait a predetermined amount of time to receive a response from external device 202 (e.g., user interface 102) using the second communication protocol, and determine that external device 202 (e.g., user interface 102) does not communicate using the second communication protocol after the predetermined amount of time has elapsed and computing device 206 has not received a communication from external device 202 (e.g., user interface 102) using the second communication protocol. The predetermined amount of time may be, for example, 30 seconds. Computing device 206 may cycle through every communication protocol stored in memory area 310 in accordance with the above process to identify a communication protocol used by external device 202.

Referring again to FIG. 4, computing device 206 communicates 406 with external device 202 (e.g., user interface 102) using the first communication protocol. For example, computing device 206 may receive a command from external device 202 (e.g., user interface 102) using the first communication protocol. The command may be, for example, a command to set a speed of motor 106. As another example, the command may be a command to set a time period associated with an operation of motor 106. As yet another example, in communicating with external device 202 (e.g., user interface 102), computing device 206 may transmit status information to external device 202, for example an error message or fault code, using the first communication protocol.

The methods and systems described herein may be implemented using computer programming or engineering techniques including computer software, firmware, hardware or any combination or subset thereof, wherein the technical effect may include at least one of: (a) detecting, by a computing device in a motor controller, that an external device has connected to a communication port of the motor controller; (b) identifying a first communication protocol used by the external device, wherein the first communication protocol is one of a plurality of communication protocols that the computing device is capable of using; and (c) communicating with the external device using the first communication protocol.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 305, including RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

As compared to known systems and methods for enabling communication between a motor controller and an external device, the systems and methods described herein enable external devices configured to communicate using different communication protocols to communicate with a motor controller. Accordingly, external devices that were not specifically manufactured to communicate with the motor controller may nevertheless communicate with the motor controller.

Exemplary embodiments of systems and methods for enabling communication between a motor controller and external device are described herein. The systems and methods described herein are not limited to the specific embodiments described herein, but rather, components of the systems and/or steps of the methods may be utilized independently and separately from other components and/or steps described herein.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for enabling communication between a motor controller and an external device, said method comprising:
   detecting, by a computing device in the motor controller, a voltage change at a communication port coupled to the computing device to determine that the external device has connected to the communication port;
   transmitting, by the computing device, an initial communication to the external device using a first communication protocol of a plurality of communication protocols stored on a memory of the motor controller upon determining that the external device has connected to the communication port;
   when a response is received from the external device using the first communication protocol, identifying, by the computing device, the first communication protocol as the protocol used by the external device and communicating with the external device thereafter using the first communication protocol to receive a command from the external device to set a speed of the motor; and
   when no response to the initial communication is received after a predetermined time period:
      transmitting a second communication to the external device using a second communication protocol;
      when a response is received from the external device using the second communication protocol, communicating with the external device thereafter using the second communication protocol; and
      determining that the external device does not communicate using the second communication protocol after the predetermined amount of time has elapsed and said computing device has not received a communication from the external device using the second communication protocol.

2. The method of claim 1, wherein the motor controller is coupled to a motor and wherein said communicating with the external device using the first communication protocol further comprises receiving a command from the external device using the first communication protocol to set a time period associated with an operation of the motor.

3. The method of claim 1, wherein said communicating with the external device using the first communication protocol further comprises transmitting status information to the external device using the first communication protocol.

4. The method of claim 1, wherein said communicating with the external device using the first communication protocol further comprises transmitting an error message to the external device using the first communication protocol.

5. A motor controller comprising:
   a communication port; and
   a computing device coupled to said communication port, said computing device comprising a processor and a memory, wherein said computing device is capable of communicating using a plurality of communication protocols stored on said memory and is configured to:
      detect a voltage change at said communication port to determine that an external device has connected to said communication port;
      transmit an initial communication to the external device using a first communication protocol of the plurality of communication protocols upon determining that the external device has connected to said communication port;
      when a response is received from the external device using the first communication protocol, identify the first communication protocol as the protocol used by the external device and communicate with the external device thereafter using the first communication protocol to receive a command from the external device to set a speed of the motor; and when no response to the initial communication is received after a predetermined time period:
  transmit a second communication to the external device using a second communication protocol;
  when a response is received from the external device using the second communication protocol, communicate with the external device thereafter using the second communication protocol; and
  determine that the external device does not communicate using the second communication protocol after the predetermined amount of time has elapsed and said computing device has not received a communication from the external device using the second communication protocol.

6. The motor controller of claim 5, wherein said motor controller is coupled to a motor and wherein said computing device is further configured to communicate with the external device using the first communication protocol by receiving a command from the external device using the first communication protocol to set a time period associated with an operation of the motor.

7. The motor controller of claim 5, wherein said computing device is further configured to communicate with the external device using the first communication protocol by transmitting status information to the external device using the first communication protocol.

8. The motor controller of claim 5, wherein said computing device is further configured to communicate with the external device using the first communication protocol by transmitting an error message to the external device using the first communication protocol.

9. The motor controller of claim 5, wherein said motor controller further comprises a communication protocol selection device coupled to said computing device, and said computing device is further configured to identify the first communication protocol by detecting that said communication protocol selection device has been set to the first communication protocol.

10. A computer-readable storage memory device having processor-executable instructions embodied thereon, for enabling communication between a motor controller and an external device, wherein when executed by a computing device included in the motor controller and coupled to a communication port, the processor-executable instructions cause the computing device to:
  detect a voltage change at the communication port to determine that an external device has connected to the communication port;
  transmit an initial communication to the external device using a first communication protocol of a plurality of communication protocols stored on a memory of the motor controller upon determining that the external device has connected to the communication port;
  when a response is received from the external device using the first communication protocol, identify the first communication protocol as the protocol used by the external device and communicate with the external device thereafter using the first communication protocol to receive a command from the external device to set a speed of the motor; and
  when no response to the initial communication is received after a predetermined time period:
    transmit a second communication to the external device using a second communication protocol;
    when a response is received from the external device using the second communication protocol, communicate with the external device thereafter using the second communication protocol; and
    determine that the external device does not communicate using the second communication protocol after the predetermined amount of time has elapsed and said computing device has not received a communication from the external device using the second communication protocol.

* * * * *